United States Patent
Misawa

[19]

[11] Patent Number: 6,158,536
[45] Date of Patent: Dec. 12, 2000

[54] STAIR-CLIMBING VEHICLE FOR WHEELCHAIR

[75] Inventor: Rintaro Misawa, Saitama-ken, Japan

[73] Assignee: Sunwa Ltd., Tokyo, Japan

[21] Appl. No.: 08/873,747

[22] Filed: Jun. 12, 1997

[30] Foreign Application Priority Data

Oct. 29, 1996 [JP] Japan ..................................... 8-286753

[51] Int. Cl.[7] .................................................. B62D 55/00
[52] U.S. Cl. ................................ 180/9.32; 280/DIG. 10; 180/901
[58] Field of Search ................................ 180/9.32, 9.21, 180/6.7, 901; 280/DIG. 10

[56] References Cited

U.S. PATENT DOCUMENTS

| | | | |
|---|---|---|---|
| 3,869,011 | 3/1975 | Jenson .................................... | 180/9.32 |
| 4,176,851 | 12/1979 | Simonson et al. . | |
| 4,222,449 | 9/1980 | Feliz ...................................... | 180/9.32 |
| 4,411,330 | 10/1983 | Blokland ................................ | 180/9.32 |
| 4,556,229 | 12/1985 | Nihler et al. ........................... | 280/5.22 |
| 4,566,550 | 1/1986 | Misawa .................................. | 180/8.2 |
| 4,566,551 | 1/1986 | Feliz . | |
| 4,687,068 | 8/1987 | Pagett .................................... | 180/8.2 |
| 4,771,839 | 9/1988 | Misawa .................................. | 180/8.2 |
| 4,898,256 | 2/1990 | Lehner ................................... | 180/8.2 |
| 4,926,941 | 5/1990 | Rembos ................................. | 280/5.22 |
| 5,036,929 | 8/1991 | Trougouboff .......................... | 180/8.2 |
| 5,123,495 | 6/1992 | Littlejohn et al. .................... | 180/9.32 |
| 5,197,558 | 3/1993 | Misawa . | |
| 5,552,703 | 9/1996 | Hore .................................... | 324/207.22 |
| 5,641,030 | 6/1997 | Toselli . | |
| 5,676,215 | 10/1997 | Misawa ................................. | 180/9.52 |
| 5,868,402 | 2/1999 | Eguchi et al. . | |

FOREIGN PATENT DOCUMENTS

226 489A1  6/1987  European Pat. Off. .

*Primary Examiner*—Kevin Hurley
*Assistant Examiner*—Andrew J. Fischer
*Attorney, Agent, or Firm*—Arent Fox Kintner Plotkin & Kahn, PLLC

[57] ABSTRACT

There is provided a stair-climbing vehicle for transporting a wheelchair with a person sitting on. The vehicle comprise a crawler device including a pair of endless belt crawlers disposed on opposite sides of the vehicle; a vehicle body including a driving motor for driving the crawler device to enabling the stair-climbing vehicle to climb up or down a stairway; a load-carrying platform for mounting a wheelchair, said load-carrying platform being provided above the vehicle body capable of pivoting in vertical direction about one end thereof. The load-carrying platform is provided with a inclination sensor. The inclination sensor includes a first inclination sensing element and a second inclination sensing element, each inclination sensing element is a tubular member containing a flowable electrically conductive material and a pair of electrically conductive terminals.

16 Claims, 9 Drawing Sheets

PRIOR ART

STAIR-CLIMBING VEHICLE FOR WHEELCHAIR

BACKGROUND OF THE INVENTION

The present invention relates to a stair-climbing vehicle, in particular to a stair-climbing vehicle for transporting a wheelchair with a person sitting on.

Figure 7:
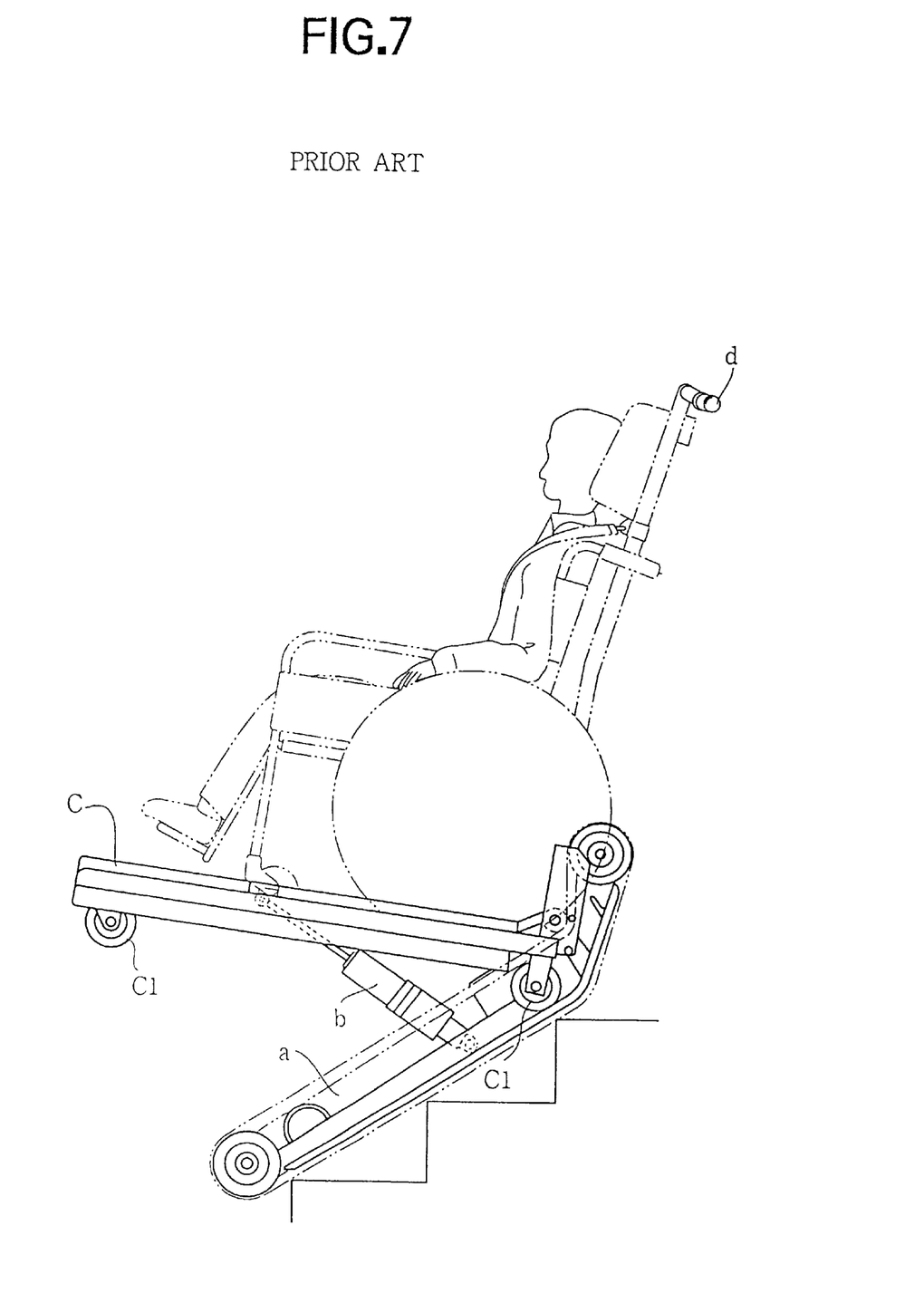
FIG. 7 is a side elevation showing a stair-climbing vehicle of a prior art.

In fact, the applicant of this application has suggested a stair-climbing vehicle for wheelchair, which was disclosed in Japanese Patent Application Laid-open No. 4-154493, as illustrated in FIG. 7. Referring to FIG. 7, the conventional stair-climbing vehicle comprises a crawler device a which includes a pair of endless belt crawlers each extending in the longitudinal direction thereof over at least two steps of a stairway while climbing up or down the stairway, a load-carrying platform C for holding a wheelchair with a person sitting on, two pairs of travelling wheels C1 (with one pair provided under the front portion of the load-carrying platform C and another pair provided under the rear portion thereof), an electric cylinder b for pivotally raising the load-carrying platform C, an operation handle d for operating the stair-climbing vehicle.

When travelling on a horizontal ground surface, the electric cylinder b is caused to retract so that all the travelling wheels C1 will get in contact with ground surface. When climbing up or down a stairway, a change-over switch (not shown) provided on the operation handle d is operated to cause the cylinder b to extend, so that the load-carrying platform C is pivotally raised up to form an angle of 40° with respect with the crawler device a.

In this way, as shown in FIG. 7, a person sitting on the wheelchair may be moved up or down a stairway with his wheelchair slightly inclined rearwardly. In practice, in order to eliminate an uncomfortable or even a terrible feeling, the load-carrying platform C is designed to be able to incline rearwardly a little when travelling up or down a stairway, such that the load-carrying platform C forms an angle of 5°–10° with a horizontal plane.

However, when the stair-climbing vehicle is climbing up or down a stairway which has only a small inclining angle with a horizontal plane, the loading stand C will be inclined rearwardly too much if load-carrying platform C remains an angle of 40° with respect with the crawler device a. As a result, because the load-carrying platform is rearwardly inclined too much, a person sitting on the wheelchair will have an uncomfortable or even a terrible feeling. In order to solve such a problem, it has been suggested that an inclination sensing/controlling device be provided to detect such an angle. But, if an inclination sensing/controlling device is employed, it will be unavoidable to cause an increase in the cost for the manufacture of a stair-climbing vehicle.

SUMMARY OF THE INVENTION

It is an object of the present invention to provide an improved stair-climbing vehicle for wheelchair, in which a load-carrying platform for holding a wheelchair may be easily pivoted to form a desired angle with a crawler device corresponding to an inclining angle of a stairway, without causing any increase in the cost for the manufacture of a stair-climbing vehicle, therefore solving the above-mentioned problems peculiar to the above-mentioned prior art.

According to the present invention, there is provided a stair-climbing vehicle for transporting a wheelchair with a person sitting on. The vehicle comprises a crawler device including a pair of endless belt crawlers disposed on opposite sides of the vehicle; a vehicle body including a driving motor for driving the crawler device to enable the stair-climbing vehicle to climb up or down a stairway; a load-carrying platform for mounting a wheelchair, said load-carrying platform being provided above the vehicle body capable of pivoting in vertical direction about one end thereof. The load-carrying platform is provided with a inclination sensor. The inclination sensor includes a first inclination sensing element and a second inclination sensing element, each inclination sensing element is a tubular member containing a flowable electrically conductive material and a pair of electrically conductive terminals.

In one aspect of the present invention, the first inclination sensing element is inclined forming an angle α with a horizontal line of the load-carrying platform, preferably the angle α is 13°–18°. The second inclination sensing element is inclined forming an angle β with an extended line of the first inclination sensing member, preferably the angle β is 5°–10°.

In detail, the flowable electrically conductive material is mercury.

In another aspect of the present invention, the crawler device includes a front operating member and a rear operating member, which are connected with each other and are capable of cooperating into an inverted "V" through a mutually connected point. Further, a rod of an extending/retracting cylinder is connected to the rear operating member near the mutually connected point, such that the front operating member and the rear operating member are normally kept straight, but will be formed into an inverted "V" by cylinder's retracting movement, so as to effect a smooth movement of the stair-climbing vehicle from a stairway to a horizontal ground surface, or vice versa.

The above objects and features of the present invention will become more understood from the following description with reference to the accompanying drawings.

DETAILED DESCRIPTION OF THE PREFERRED EMBODIMENTS

Figures 1, 1A:
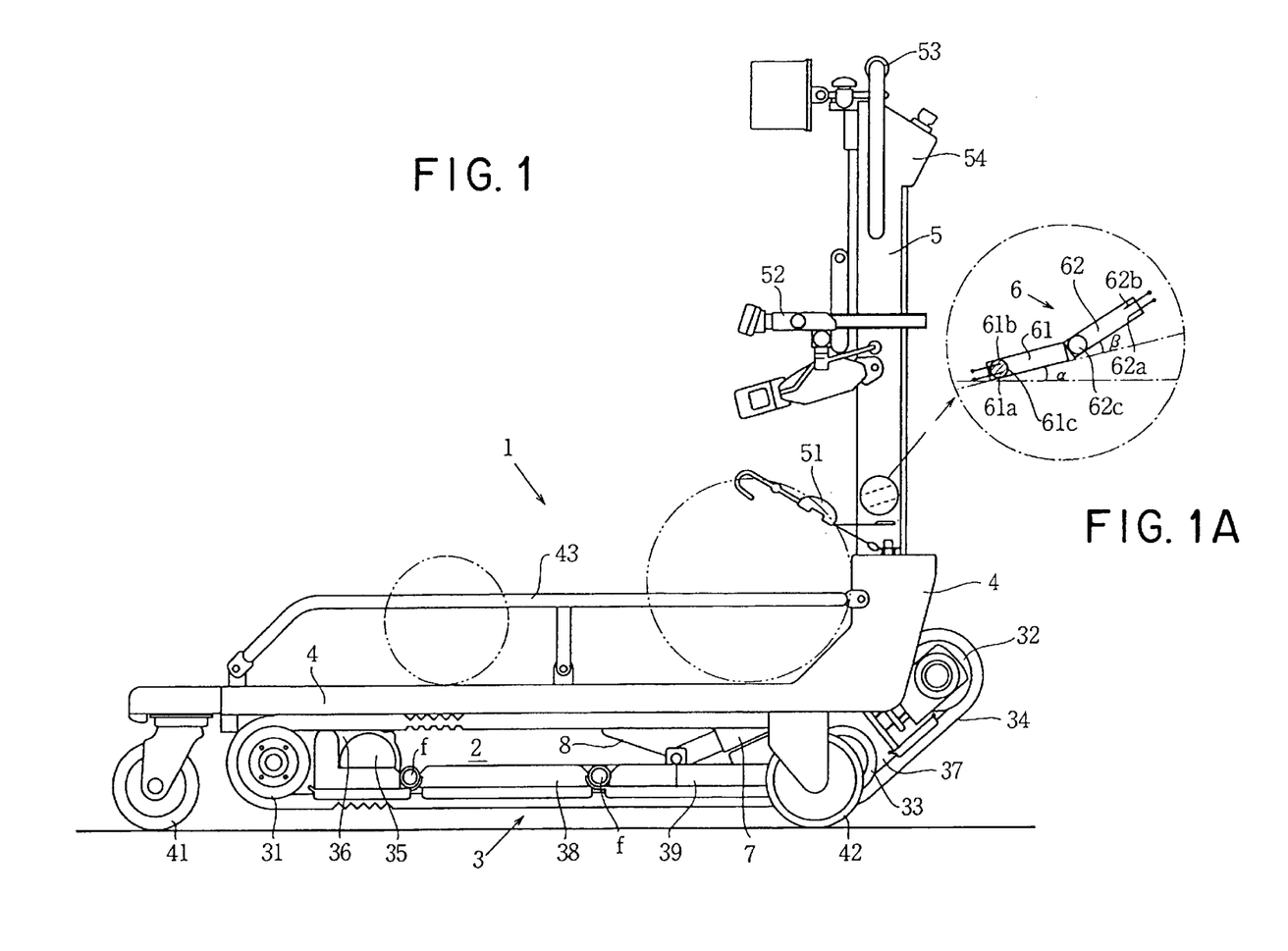
FIG. 1 is a side elevation showing a stair-climbing vehicle for wheelchair, constructed according to the present invention.

Referring to FIG. 1, a stair-climbing vehicle 1 of the present invention comprises a vehicle body 2, a crawler devices 3 including a pair of endless belt crawlers disposed on opposite sides of the vehicle body 2, a load-carrying platform 4 provided on the vehicle body 2 so as to be vertically pivotable about one end thereof. An upright stand 5 is provided on the rear end of the load-carrying platform 4, and an inclination sensor 6 is provided on the upright stand 5.

The crawler device 3 includes a pair of front driving wheels 31, 31 provided on the front side thereof, a pair of rear driven wheels 32, 32 provided on the rear side thereof, a pair of rotating wheels 33, 33 disposed closed to the rear driven wheels 32, 32. A pair of endless belt crawlers 34, 34 are arranged to pass around and engage with the driving wheels 31, 31, the driven wheels 32, 32 and the rotating wheels 32, 32. A driving motor 35 and a speed reducer 36 are mounted in the front portion of the vehicle body 2. An electric cylinder 7 and another electric cylinder 8 are provided in the vehicle body 2. Also provided in the vehicle body 2 are battery for supplying electricity power to the motor 35, the cylinder 7 and another electric cylinder 8. Further, some electric elements 37 is also mounted on the vehicle body 2.

Between the driving wheels 31, 31 and the rotating wheels 33, 33 are provided a pair front operating members 38, 38 and a pair of rear operating members 39, 39. The front operating members 38, 38 and the rear operating members 39, 39 are pivotally supported on the crawler device 3. Moreover, each front operating member 38 and each rear operating member 39 are connected with each other so that they may cooperate to form an inverted "V" with a connection point f at a top.

The rod portion of the cylinder 7 is connected to the rear operating member 39 near the connection point f. The electric cylinder 7 may be operated to extend or retract effected by a signal from the inclination sensor 6. The sensor 6 is so provided that as soon as it detects that the stair-climbing vehicle 1 has climbed up to reach the upmost step of a stairway, the electric cylinder 7 will retract.

Figure 5:
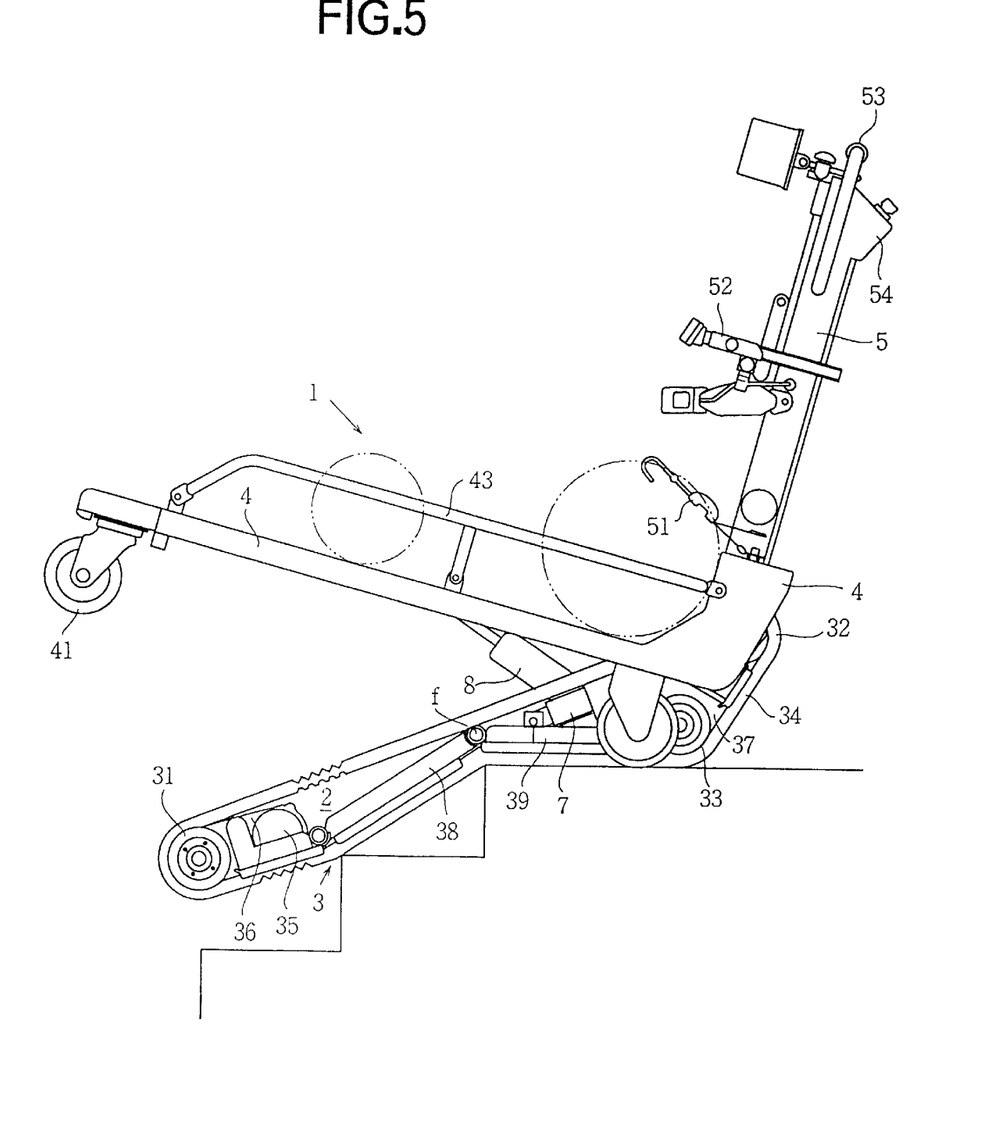
FIG. 5 is a side elevation showing a stair-climbing vehicle of FIG. 1, which is arriving at a horizontal floor from a stairway.

When the stair-climbing vehicle 1 is travelling on a horizontal ground surface or climbing up or down a stairway, the electric cylinder 7 is caused to extend, so that a front operating member 38 and a rear operating frame 39 are kept at a straight line, thereby enabling the stair-climbing vehicle 1 to move in a stabilized manner. Further, when the stair-climbing vehicle 1 reaches the upmost step of a stairway, the vehicle 1 will be changed from an inclined position into a horizontal position, or vice versa. Such kind of movement will be detected by the sensor 6 which will then cause the electric cylinder 7 to retract. As a result, the front operating member 38 and the rear operating member 39 will cooperate to form an inverted "V", as shown in FIG. 5. In this way, since the belt crawler 34 is caused to bend into an inverted "V", the stair-climbing vehicle 1 does not have to change a great deal in its travelling position so as to effect a smooth movement from stairway to horizontal ground surface or vice versa (see FIG. 5).

The load-carrying platform 4 is provided on the vehicle body 2 and it is pivotable in vertical direction about the rear end thereof.

The load-carrying platform 4 has a pair of front casters 41, 41 and a pair of rear casters 42, 42. When travelling on horizontal ground surface, the electric cylinder 8 is retracted, so that the front casters 41, 41 and the rear casters 42, 42 will project beyond the ground contacting surface of the crawler device 3, upwardly separating the crawler device 3 from the ground surface, thereby enabling the vehicle 1 to run on the ground surface by means of the front caster 41, 41 and the rear caster 42, 42, as illustrated in FIG. 1.

Figures 2, 2A:
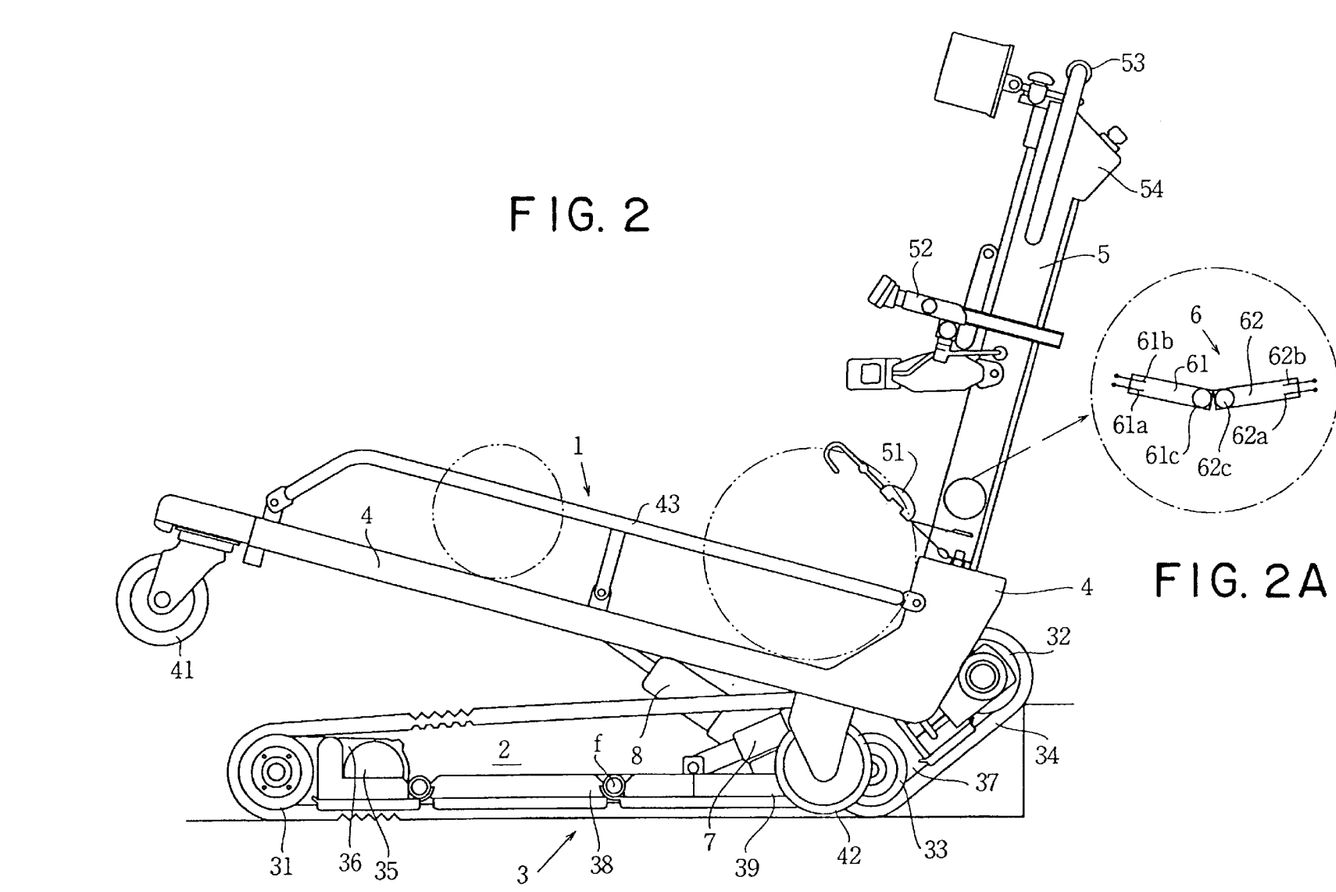
FIG. 2 is a side elevation showing a stair-climbing vehicle of FIG. 1, which is in position immediately before climbing up a stairway.

As illustrated in FIG. 2, when the stair-climbing vehicle 1 is about to climb up a stairway, the electric cylinder 8 will extend so as to cause the load-carrying platform 4 to upwardly pivot about the rear end thereof, enabling the front casters 41, 41 and the rear casters 42, 42 to upwardly separate from the ground surface, making the crawler device 3 to get in contact with the ground. In this manner, the vehicle 1 is able to start its climbing up a stairway by driving the crawler device 3.

The load-carrying platform 4 is constructed to mount a wheelchair. In fact, a sliding plate (not shown) is received in the front portion of the load-carrying platform 4. When a wheelchair is about to be mounted on the load-carrying platform 4, the sliding plate slides out to serve as a slope plate between the ground surface and the front portion of the load-carrying platform 4. Thus, a wheelchair may be moved from the ground surface through the slope plate onto the load-carrying platform 4. Further, in order to prevent the wheelchair from dropping off the load-carrying platform 4, a pair of safety bars 43, 43 are provided on both sides of the load-carrying platform 4.

The upright stand 5 is provided on the rear end of the load-carrying platform 4. A first retaining device 51 and a second retaining device 52 are provided on the upright stand 5 in order to firmly hold the wheelchair on the load-carrying platform 4. Further, an operating handle 53 and an operation panel 54 are provided on the upper portion of the upright stand 5, thus, when moving the vehicle 1, an operator (person) can grip the handle 53 while performing necessary operation on the operation panel 54, thereby enabling the vehicle 1 to move in a desired manner.

One of the most important features of the present invention is that an inclination sensor 6 which includes a first inclination sensing element 61 and a second inclination sensing element 62 is provided on the upright stand 5. The first inclination sensing element 61 is a tubular member having at one end thereof a pair of electrically conductive terminals 61a, 61b. Similarly, the second inclination sensing element 62 is also a tubular member having at one end thereof a pair of electrically conductive terminals 62a, 62b. Each of the tubular members contains a flowable mercury material 61c or 62c having a predetermined quantity enough to make conductive between the terminals 61a and 61b or between the terminals 62a and 62b. When the mercury material 61c or 62c gets in touch with the terminals 61a and 61b or the terminals 62a and 62b, the terminals 61a and 61b or the terminals 62a and 62b will become electrically conducting with each other. As a result, a motor 81 for driving the electric cylinder 8 will be energized, which will be described in more detail later.

As shown in an enlarged part of FIG. 1, the first inclination sensing element 61 is arranged to form an angle α with a horizontal plane. Preferably, the angle α is 15° with the right end of the element 61 being higher as indicated in the drawing. Further, the second inclination sensing element 62 is arranged to form an angle β with an extended line of the first inclination sensing element 61. Preferably, the angle β is 5° with the right end of the element 62 being higher as indicated in the drawing.

Figure 6:
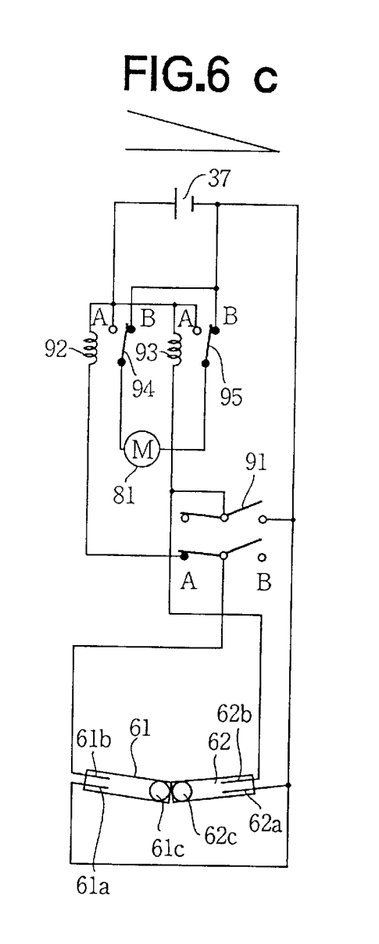
FIGS. 6a–6h indicate electric circuits for controlling the pivoting movement of the load-carrying platform of the stair-climbing vehicle of FIG. 1.

An electric circuit 9 in connection with the first and second inclination sensing elements 61 and 62 is indicated in detail in FIG. 6a. As illustrated in FIG. 6a, the electric circuit 9 includes the terminals 61a, 61b, 62a, 62b, a battery 37, a motor 81 which is used for driving the electric cylinder 8. The circuit 9 further includes a manual switch 91, electro-magnetic coils 92, 93, change-over switches 94 and 95 operated by the electromagnetic coils 92, 93. In practice, the change-over switches 94 and 95 are normally in contact with points B in the circuit.

The operation of the stair-climbing vehicle 1 will be described in detail below with reference to FIGS. 1–5 and FIGS. 6a–6h.

Referring to FIG. 1, when the stair-climbing vehicle 1 is moving on a horizontal ground surface, the load-carrying platform 4 and the vehicle body 2 are in a horizontal and mutually parallel position, so that the pair of front casters 41, 41 and the pair of rear casters 42, 42 (all provided on the underside of the load-carrying platform 4) are in contact with the ground surface.

When the stair-climbing vehicle 1 is about to travel from the horizontal ground onto a stairway so as to climb up or down the stairway, the manual switch 91 (connected to and provided on the surface of the operation panel 54) is switched ON (FIG. 6b). At this moment, since the first inclination sensing element 61 is in a position having an angle $\alpha$ 15° with a horizontal plane, the mercury material 61c will move downwardly to touch with the terminals 61a and 61b located at lower end of the tubular member, therefore the terminals 61a and 61b become electrically conductive with each other. Thus, as shown in FIG. 6b, since the manual switch 91 is ON (in contact with side A), the electro-magnetic coil 92 will be energized to generate a magnetic attracting force, so as to cause the change-over switch 94 to get in contact with side A. Consequently, the motor 18 will begin to rotate in one predetermined direction so that the electric cylinder 8 will extend. Then, as fast as the load-carrying platform 4 is pivoted upwardly to form an angle of 15° with the vehicle body 2, the flowable mercury material 61c will move to the other end of the cylindrical member, so that the circuit 9 will be interrupted and the motor 81 will stop, as shown in FIG. 6c.

At this moment, the vehicle 1 will be in a position shown in FIG. 2. As shown in FIG. 2, since the load-carrying platform 4 is pivoted upwardly to form an angle with the vehicle body 2, the front casters 41, 41 and the rear casters 42, 42 will be raised so as to be separated from the ground surface, causing the crawler device 3 to contact with the ground surface. With the load-carrying platform 4 inclined rearwardly forming an angle of 15° with the vehicle body 2, a person sitting on a wheelchair will not have an uncomfortable or a terrible feeling while the vehicle 1 is climbing up or down a stairway.

Figures 3, 3A:
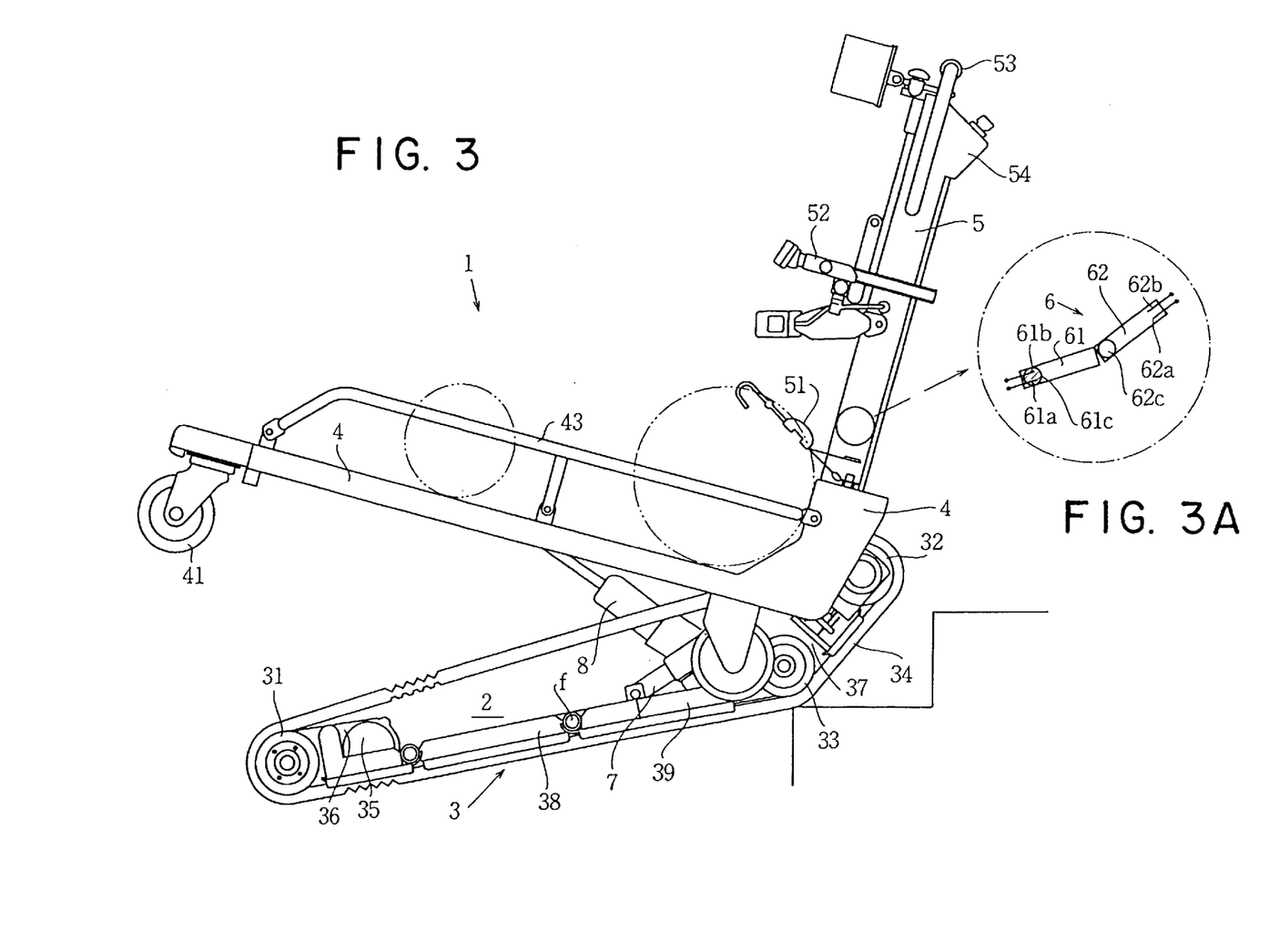
FIG. 3 is a side elevation showing a stair-climbing vehicle of FIG. 1, which is beginning to climb a stairway.

Referring to FIG. 3, when the stair-climbing vehicle 1 has begun its climbing up or down a stairway by driving its crawler device 3, the load-carrying platform 4 is pivoted upwardly still further. During this process, as shown in FIG. 6d, the flowable mercury material 61c of the first inclination sensing element 61 moves back to get in touch with the terminals 61a, 61b again, so that the circuit 9 is again energized and the motor 81 will begin to rotate again, thereby causing the electric cylinder 8 to extend still more, thus enabling the load-carrying platform 4 to pivot upwardly still further.

Thus, when the stair-climbing vehicle 1 begins to climb up or down a stairway, although there is a tendency for the load-carrying platform 4 to incline forwardly a little corresponding to a stairway inclination condition, but in fact this kind of forward inclination will be completely prevented since the load-carrying platform 4 has already inclined rearwardly forming an angle of 15° with the vehicle body 2.

Figures 4, 4A:
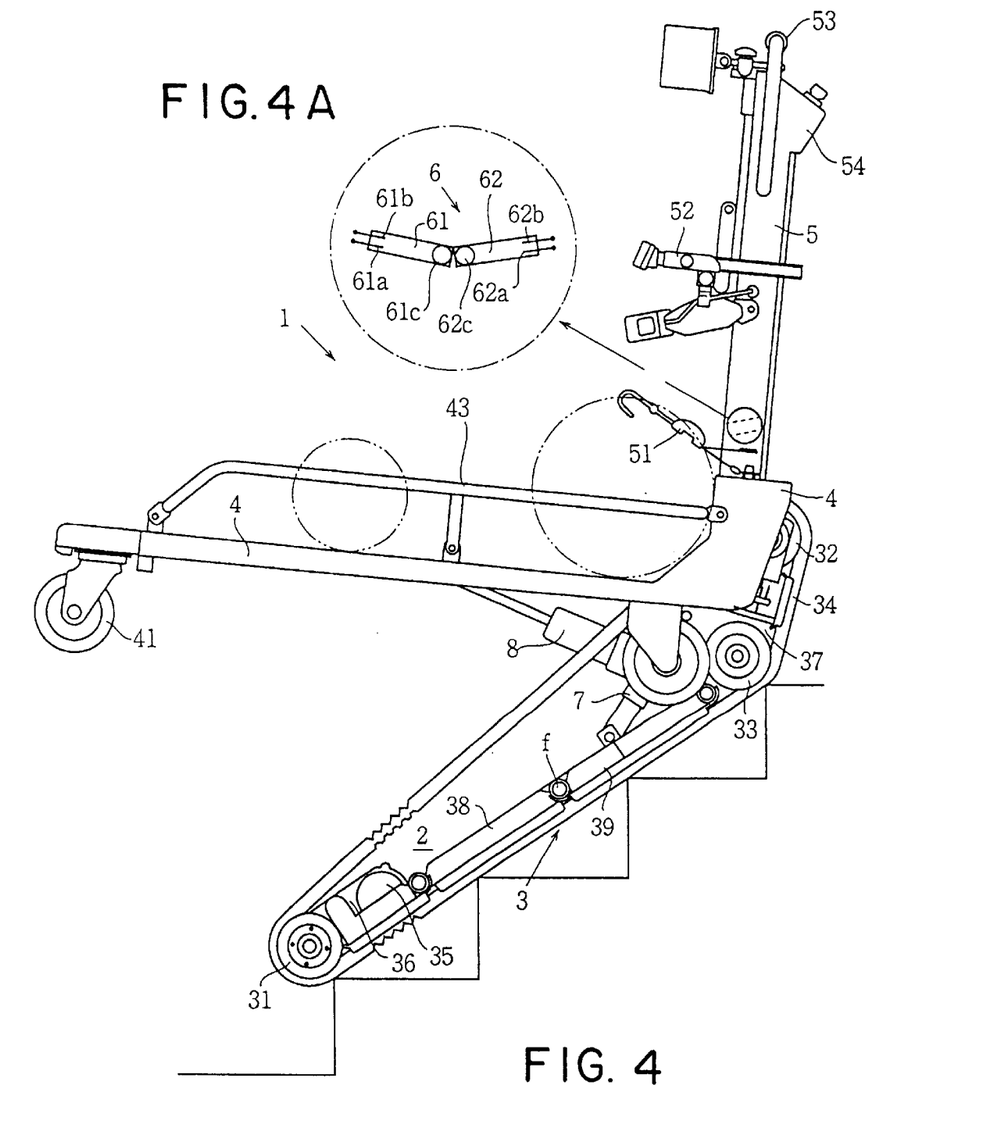
FIG. 4 is a side elevation showing a stair-climbing vehicle of FIG. 1 which is in the halfway of climbing a stairway.

As shown in FIG. 4, when the load-carrying platform 4 is disposed at least on a horizontal position, or slightly inclined rearwardly forming a small angle with the vehicle body 2, the flowable mercury material 61c will move to the other end of the cylindrical member 61, so that the circuit 9 will be interrupted again and the motor 81 will stop, as shown in FIG. 6e.

In this way, a person sitting on a wheelchair will not have an uncomfortable or a terrible feeling while the vehicle 1 is climbing up or down a stairway.

Referring to FIG. 5, when the stair-climbing vehicle 1 reaches the upmost step of a stairway, it is necessary for the vehicle 1 to change from its inclined position into its horizontal position. At this time, another sensor (not shown) will detect the arrival of the vehicle 1 at the upmost step of the stairway, supplying an operation signal to the cylinder 7 so as to caused the cylinder 7 to retract, thereby enabling the front operating member 38 and the rear operating member 39 to cooperate in order to form an inverted "V". With the cooperation of the members 38, 39 to form the inverted "V", the belt crawler 34 is also caused to bend into an inverted "V" shape. As a result, the stair-climbing vehicle 1 does not have to change greatly in its travelling position so as to effect a smooth movement from stairway to horizontal ground surface, or vice versa.

When the stair-climbing vehicle 1 travels from a stairway to a horizontal ground surface, since the load-carrying platform 4 is inclined rearwardly, the flowable mercury material 62c will move to the other end of the cylindrical member 62 (FIG. 6f), permitting electric connection between terminals 62a and 62b. In this way, as shown in FIG. 6f, the circuit 9 is energized and the electro-megnetic coil 95 will generate magnetic force to attract the change-over switch 95 to the side A. Thus, the motor 81 will begin to rotate in an opposite direction to cause the electric cylinder 8 to retract.

Further, as fast as the load-carrying platform 4 is returned to its position as shown in FIG. 2 (an initially inclined position), the flowable mercury material 62c will move back to its original position in the cylindrical member (FIG. 6g), thus the circuit 9 will be interrupted and the electric power supply will be shutoff.

Afterwards, as shown in FIG. 6h, by switching off the manual switch 91 (moving the switch 91 to contact side B), the motor 81 continues to rotate in the above opposite direction to cause the electric cylinder 8 to retract still further, thus causing the load-carrying platform 4 to change back to a complete horizontal position (as shown in FIG. 1).

As is understood from the above description, since the load-carrying platform 4 may be pivoted to form any desired angle with the vehicle body 2 in view of an actual inclining degree of a stairway, it has become surely possible to eliminate any uncomfortable or even terrible feelings a person might have when sitting on the wheelchair mounted on the stair-climbing vehicle climbing up or down a stairway.

Since the inclination sensing elements 61 and 62 employ a flowable mercury material 61c and 62c as an electrically conductive means, it is allowed not only to ensure a high reliability in use, but also to reduce the cost for the manufacture of a stair-climbing vehicle by dispensing with commercially available but quite expensive inclination sensors.

While the presently preferred embodiments of the this invention have been shown and described above, it is to be understood that these disclosures are for the purpose of illustration and that various changes and modifications may be made without departing from the scope of the invention as set forth in the appended claims.

What is claimed is:

1. A stair-climbing vehicle for transporting a wheelchair with a person sitting on, the stair-climbing vehicle comprising:
   a crawler device including a pair of endless belt crawlers disposed on opposite sides of the vehicle;
   a vehicle body including a driving motor for driving the crawler device to enabling the stair-climbing vehicle to climb up or down a stairway;
   a load-carrying platform for mounting a wheelchair, said load-carrying platform being provided above the vehicle body capable of pivoting about a horizontal axis relative to said vehicle body;
   wherein the vehicle body and the load-carrying platform are connected with each other through an electrical cylinder, the load-carrying platform being provided with an inclination sensor;
   wherein the inclination sensor includes a first inclination sensing element and a second inclination sensing element, each inclination sensing element is a tubular member containing a flowable electrically conductive material and a pair of electrically conductive terminals; and
   wherein when said inclination sensor is in operation, said electrical cylinder operates to pivot said load-carrying platform in response to an operation signal output by either of said first and second inclination sensing elements, and
   when said load-carrying platform is horizontal and said inclination sensor is in operation, one of said first and second inclination sensing elements always operates to output an operation signal to thereby operate said electrical cylinder.

2. A stair-climbing vehicle according to claim 1, wherein the first inclination sensing element is inclined forming an angle α with a horizontal line of the load-carrying platform, wherein the angle α is within the range of 13°–18°.

3. A stair-climbing vehicle according to claim 1, wherein the second inclination sensing element is inclined forming an angle β with an extended line of the first inclination sensing element, wherein the angle β is within the range of 5°–10°.

4. A stair-climbing vehicle according to claim 1, wherein the flowable electrically conductive material is mercury.

5. A stair-climbing vehicle according to claim 1, wherein the crawler device includes a front operating member and a rear operating member, which are connected with each other and are capable of cooperating into an inverted "V" through a mutually connected point.

6. A stair-climbing vehicle according to claim 5, wherein a rod of an extending/retracting cylinder is connected to the rear operating member near the mutually connected point, such that the front operating member and the rear operating member are normally kept straight, but will be formed into an inverted "V" by cylinder's retracting movement, so as to effect a smooth movement of the stair-climbing vehicle from a stairway to a horizontal ground surface, or vice versa.

7. A stair-climbing vehicle according to claim 1, wherein when said load-carrying platform is horizontal, said flowable electrically conductive material of said first inclination sensing element electrically connects the pair of electrically conductive terminals of said first inclination sensing element, and said flowable electrically conductive material of said second inclination sensing element does not electrically connect the pair of electrically conductive terminals of said second inclination sensing element.

8. A stair-climbing vehicle according to claim 1, wherein each of said inclination sensing elements operates to output an operation signal when said flowable electrically conductive material connects said pair of electrically conductive terminals.

9. A stair-climbing vehicle according to claim 1, further comprising:
   a circuit electrically connected to said first and second inclination elements, including
      a motor connected to drive said electrical cylinder,
      a power source, and
      a switching assembly, selectively connecting said motor to said power source in response to said operation signals output by said inclination sensing elements.

10. A stair-climbing vehicle according to claim 9, wherein
   first terminals of said electrically conductive terminals of said inclination sensing elements are connected to a low potential terminal of said power source, and wherein
   said switching assembly includes
      first and second coils each connected at a first end to a high potential terminal of said power source, and connected at a second end to a second terminal of said electrically conductive terminals of said first and second inclination sensing elements, respectively,
      first and second switches having first ends connected to opposite terminals of said motor and having second ends mechanically biased to be connected to said low potential terminal of said power source, moveable to be connected to said high potential terminal of said power source upon respective energizing of said first and second coils,
   whereby, when said flowable electrically conductive material connects said pair of electrically conductive terminals of one of said first and second inclination sensing elements, a respective one of said first and second coils is energized to move said second end of a respective one of said first and second switches, to thereby connect one of said terminals of said motor to said high potential terminal of said power source and operate said motor.

11. A stair-climbing vehicle according to claims 10, wherein
   said circuit includes a manual switch, wherein
      said manual switch makes said inclination sensor operational by connecting said first and second inclination elements to said switching assembly, to allow said switching assembly to selectively connect said motor to said power source in response to said operation signals output by said first and second inclination elements.

12. A stair-climbing vehicle according to claim 1, further comprising:
   a manual switch moveable to a first active position, a second active position and a neutral position,
   when said manual switch is in the first active position, said electrical cylinder is responsive to said inclination sensor,
   when said manual switch is in the second active position, said electrical cylinder is operational, and
   when said manual switch is in the neutral position, said electrical cylinder is non-operational.

13. A stair-climbing vehicle according to claim 1, further comprising:

a manual switch, moveable to a first active position, a second active position and a neutral position, a motor, and a power source, wherein said inclination sensor selectively connects said motor to said power source when said switch is in said first active position, said manual switch connects said motor to said power source when said manual switch is in said second active position, and said motor and power source are disconnected when said manual switch is in said neutral position.

14. A stair-climbing vehicle according to claim 1, wherein said tubular members of said first and second inclination sensing elements are elongated about first and second axes, said first axis and a plane parallel to a surface of said load-carrying platform form a first acute angle, said second axis and said plane parallel to said surface of said load-carrying platform form a second acute angle, wherein said first acute angle is not equal to said second acute angle.

15. A stair-climbing vehicle according to claim 14, wherein said first acute angle falls within a range of 13 to 18 degrees, and said second acute angle falls within a range of 18 to 28 degrees.

16. A stair-climbing vehicle according to claim 1, wherein said tubular members of said first and second inclination sensing elements are elongated about first and second axes, said first axis and a plane parallel to a surface of said load-carrying platform form a first angle, said second axis and said first axis form a second angle, wherein said first angle falls within a range of 13 to 18 degrees, and said second angle falls within a range of 5 to 10 degrees.

* * * * *